United States Patent
Nomi

(10) Patent No.: US 8,646,033 B2
(45) Date of Patent: Feb. 4, 2014

(54) PACKET RELAY APPARATUS

(75) Inventor: Motohide Nomi, Kawasaki (JP)

(73) Assignee: ALAXALA Networks Corporation, Kanagawa (JP)

( * ) Notice: Subject to any disclaimer, the term of this patent is extended or adjusted under 35 U.S.C. 154(b) by 1245 days.

(21) Appl. No.: 12/173,051

(22) Filed: Jul. 15, 2008

(65) Prior Publication Data

US 2009/0183252 A1   Jul. 16, 2009

(30) Foreign Application Priority Data

Nov. 27, 2007   (JP) ................................ 2007-306238

(51) Int. Cl.
*G06F 9/00*   (2006.01)

(52) U.S. Cl.
USPC ........................................................... 726/2

(58) Field of Classification Search
USPC ............ 726/2–5, 10, 17, 21, 27, 30; 713/153, 713/155–156, 173, 183, 185, 193; 380/229, 380/232

See application file for complete search history.

(56) References Cited

U.S. PATENT DOCUMENTS

| 7,316,031 | B2 * | 1/2008 | Griffith et al. | 713/182 |
| 7,443,983 | B2 * | 10/2008 | Tanizawa et al. | 380/270 |
| 7,831,996 | B2 * | 11/2010 | Dholakia et al. | 726/2 |
| 8,015,613 | B2 * | 9/2011 | Eyer | 726/26 |
| 8,020,205 | B2 * | 9/2011 | Keeni | 726/22 |

FOREIGN PATENT DOCUMENTS

JP    2007-267315    10/2007

* cited by examiner

*Primary Examiner* — Joseph P. Hirl
*Assistant Examiner* — Leynna Truvan
(74) *Attorney, Agent, or Firm* — Antonelli, Terry, Stout & Kraus, LLP.

(57) ABSTRACT

A packet relay apparatus keeps only packets specified as authentication target packets of MAC address authentication, to reduce the number of packets to be transferred from H/W to a CPU. In addition to a source MAC address, the authentication target packet of MAC address authentication is specified by an Ethernet type, a destination IP address, a protocol, a source port number and a destination port number of TCP/UDP, and the like. In this way, the packet relay apparatus excludes a terminal not transmitting authentication target packets of MAC address authentication, from the MAC address authentication target, while allowing selection from other authentication methods such as Web authentication and IEEE802.1X authentication.

12 Claims, 9 Drawing Sheets

FIG. 4

| | PACKET CONDITION 1211 | OPERATION 1222 |
|---|---|---|
| T3E1 | SOURCE MAC ADDRESS: A | RELAY |
| T3E2 | SOURCE MAC ADDRESS: B | RELAY |
| T3E3 | SOURCE MAC ADDRESS: C<br>UDP DESTINATION PORT NUMBERS 5001 - 5300 | RELAY |
| T3E4 | SOURCE MAC ADDRESS: C<br>UDP DESTINATION PORT NUMBERS 6001 - 6300 | RELAY |

121

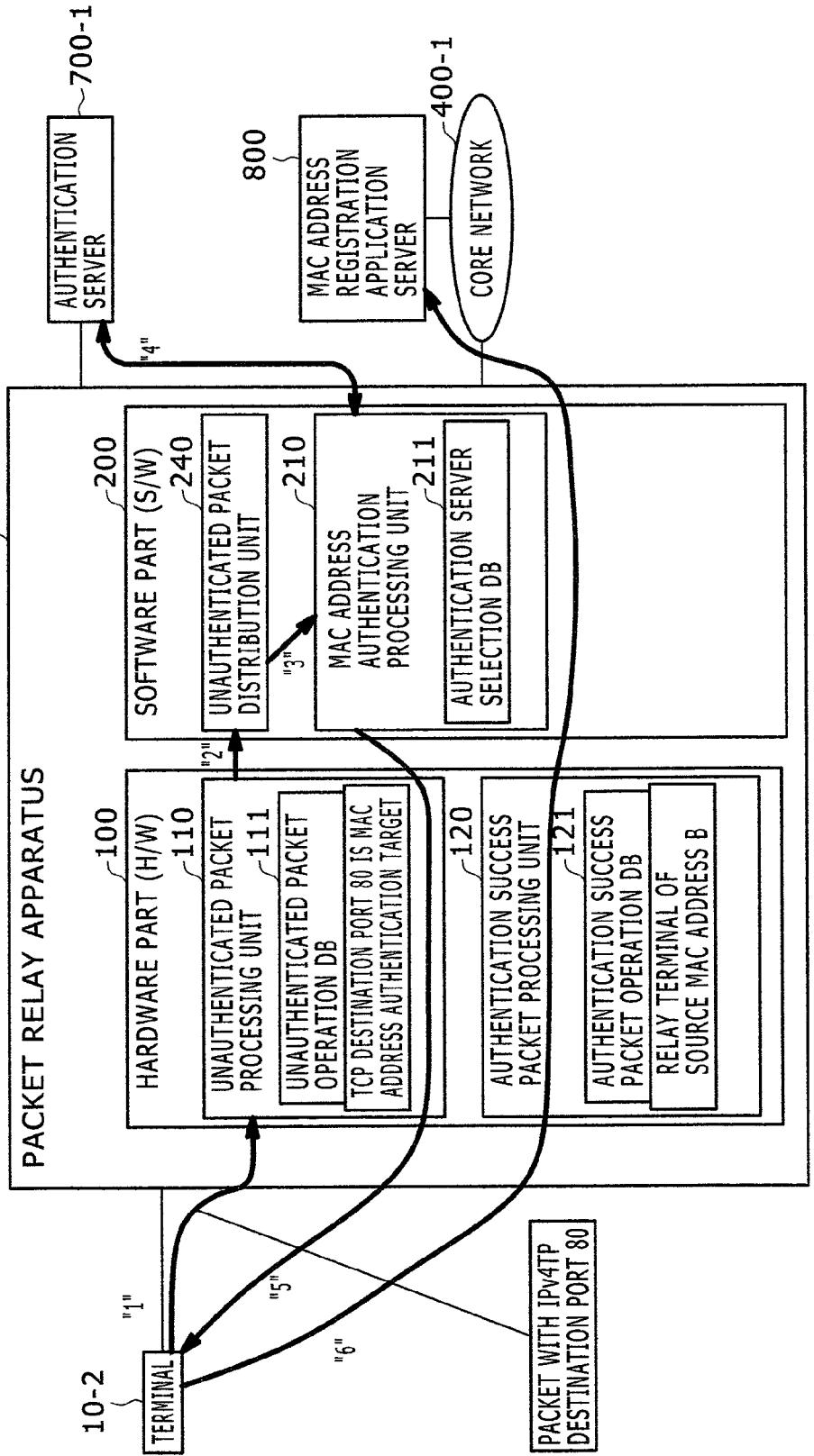

PACKET RELAY APPARATUS

CLAIM OF PRIORITY

The present application claims priority from Japanese patent application serial no. 2007-306238, filed on Nov. 27, 2007, the content of which is hereby incorporated by reference into this application.

BACKGROUND OF THE INVENTION

The present invention relates to a packet relay apparatus, and more particularly to a packet relay apparatus for reducing the load on a processing unit.

In MAC address authentication in a network authentication system, an authentication server determines whether to permit or prohibit communication of a packet transmitted from a terminal, based on the source MAC address of the packet as information for authentication.

In a network authentication system, a packet relay apparatus discards a packet to be communicated to a core network from an unauthenticated terminal or from a terminal whose communication is prohibited by an authentication server. The packet relay apparatus relays communication of a packet from a terminal whose communication is permitted by the authentication server.

When MAC authentication is performed in the packet relay apparatus, all packets transmitted from a terminal will be target packets for authentication. For this reason, all packets transmitted from an unauthenticated terminal are transferred to a CPU of the packet relay apparatus, until communication permission is granted as the determination result of the authentication server and the communication permission is then set in the packet relay apparatus.

The packet relay apparatus typically performs authentication processing, even when receiving a packet from a terminal that is not intended to be authenticated. Further, the packet relay apparatus may use other authentication methods, such as IEEE802.1X authentication and Web authentication, depending on OS or application running on a single terminal. However, even in the case of using such authentication methods, the packet relay apparatus first tries authentication using MAC address authentication for all received packets.

JP-A-2007-267315 discloses a switching apparatus with a multi-authentication function including proxy authentication means. The proxy authentication means proxy-authenticates a communication party, using authentication history information of authentication history storage means. Further, the proxy authentication means proxy-authenticates using a function relating to acquisition of information about digital signature certification, within proxy authentication expansion means.

SUMMARY OF THE INVENTION

As described in the background of the invention, until authentication of a terminal is successfully completed, all packets transmitted from the terminal are treated as authentication target packets, and are transferred from a hardware part (H/W) to a software part (S/W) in the packet relay apparatus. For this reason, a load is applied to the CPU of S/W. Further, the packet relay apparatus may use other authentication methods, such as IEEE802.1X authentication and Web authentication, depending on OS or application running on a signal terminal. However, the packet relay apparatus tries authentication using MAC address authentication for all the packets. As a result, a load is applied to the CPU of S/W due to unnecessary MAC address authentication performed in the packer relay apparatus.

Next, consideration is made on the case in which polling is performed using the MAC authentication method to confirm the existence of a terminal. The polling operation uses the IP address of the terminal. However, since all packets are treated as authentication targets in MAC authentication, a dynamic host configuration protocol (DHCP) packet or IPx6 packet may also be an authentication target before the IP address is delivered, whereas it is desired to poll using IPv4 address as destination IP address. In such a case, the IPv4 address of the terminal is not obtained from the packet subjected to authentication. This is another disadvantage of performing unnecessary MAC address authentication.

To solve the above described problems, the present invention provides a packet relay apparatus that avoids unnecessary MAC address authentication, while allowing selection of authentication methods, such as MAC address authentication, Web authentication, and IEEE802.1X authentication, for each OS or application in a single terminal.

When MAC address authentication is performed in a network authentication system, a packet relay apparatus transmits the source MAC address of a packet transmitted from a terminal as information for authentication, to the authentication server. The authentication server compares the information for authentication received from the packet relay apparatus, with a database in which information for authentication has been registered in advance. Then, the authentication server transmits the determination result to the packet relay apparatus. When communication permission is granted based on the determination result, the packet relay apparatus sets H/W so that the relevant source MAC address can be relayed.

The packet relay apparatus keeps only packets specified as authentication target packets of MAC address authentication, to reduce the number of packets to be transferred from H/W to the CPU. In addition to the source MAC address, the authentication target packet of MAC address authentication is specified by the Ethernet type, destination IP address, protocol, source port number and destination port number of TCP/UDP, and the like. In this way, the packet relay apparatus excludes a terminal not transmitting authentication target packets of MAC address authentication, from the MAC address authentication target, while allowing selection from other authentication methods such as Web authentication and IEEE802.1X authentication.

In other words, the above described problems can be solved by a packet relay apparatus including: plural authentication processing units for accommodating a terminal device, relaying transmission and reception of a packet between the terminal device and an information processing device including an authentication device, transmitting an authentication request to the authentication device, and receiving an authentication determination; and an unauthenticated packet processing unit for transferring a packet from an unauthenticated terminal to one of the authentication processing units by referring to a database. The unauthenticated packet processing unit compares a type of the packet from the unauthenticated terminal, with the database. When a corresponding entry is found in the database, the unauthenticated packet processing unit transfers the packet to one of the authentication processing units.

The present invention is effective in reducing unnecessary load on a CPU of a packet relay apparatus for performing MAC address authentication in a network authentication system.

BRIEF DESCRIPTION OF THE DRAWINGS

Preferred embodiments of the present invention will now be described in conjunction with the accompanying drawings, in which:

FIG. 4 is a view showing an authentication success packet operation DB;

FIG. 9 is a block diagram showing the flow of authentication processing (part 4).

DETAILED DESCRIPTION OF THE PREFERRED EMBODIMENTS

Figure 1:
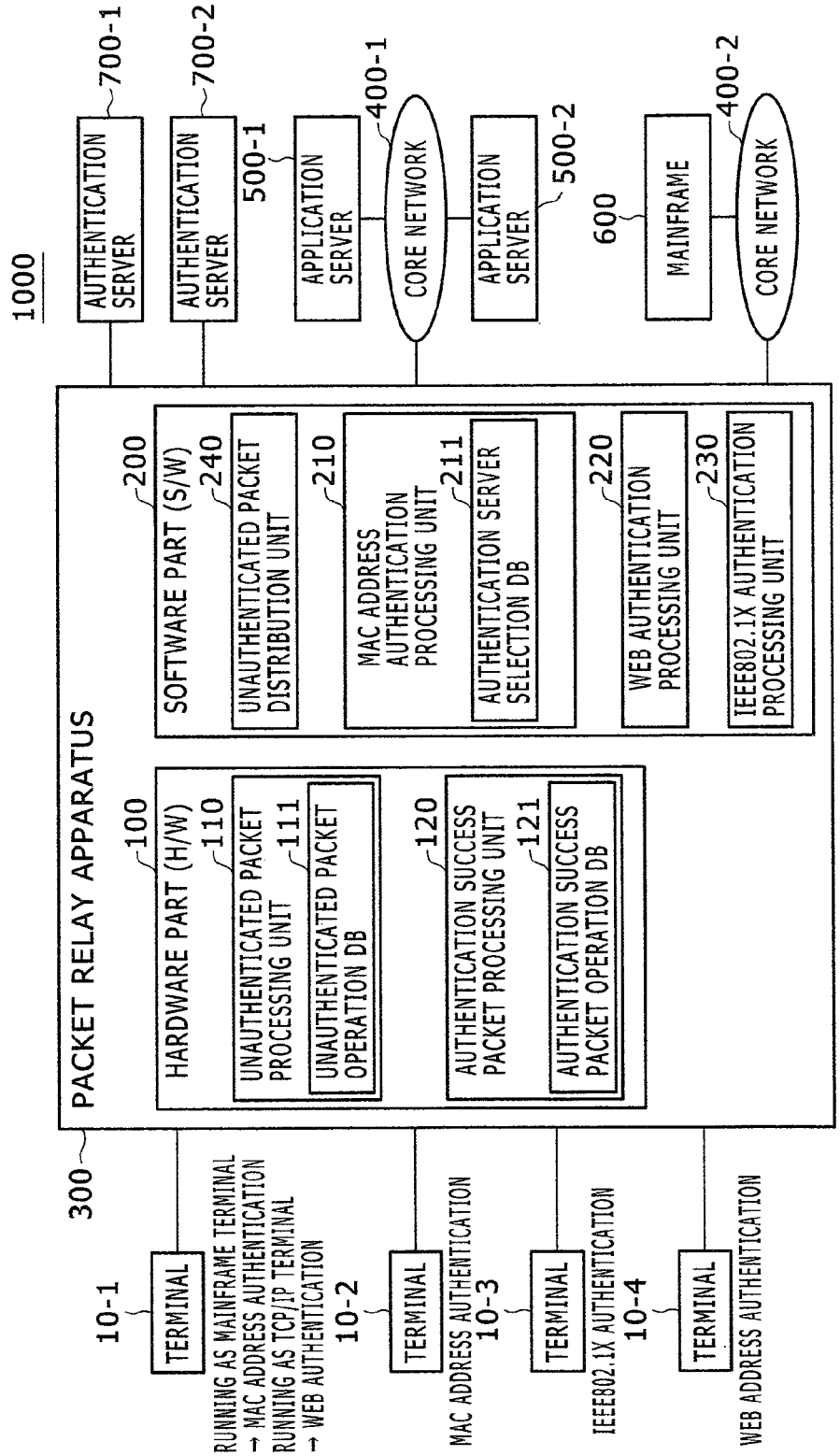
FIG. 1 shows a hardware block diagram of a network authentication system, and a functional block diagram of a packet relay apparatus.

In the following, the preferred embodiments will be described using examples with reference to the accompanying drawings. Like or corresponding parts are denoted by the same reference numerals and the description will not be repeated.

First, a network authentication system will be described with reference to FIG. 1. Here, FIG. 1 shows a hardware block diagram of a network authentication system, and a functional block diagram of a packet relay apparatus.

In FIG. 1, a network authentication system 1000 includes a packet relay apparatus 300 for relaying packets, to which four terminals 10, two authentication servers 700, and two core networks 400 are connected. By using the network authentication system 1000, a terminal whose connection to the core network 400 is authenticated, is only allowed to connect to the core network 400. The authentication server 700 includes an authentication database for determining whether the terminal 10 is allowed to connect to the network. The authentication database (not shown) of the authentication server 700 stores the MAC address with which communication is permitted for MAC address authentication, as well as the user name and password information for IEEE802.1X authentication and Web authentication. When the terminal 10 requests authentication, the authentication server 700 determines whether it matches the information registered in the authentication database.

When one of the terminals 10-1 to 10-4 tries to connect to the network, the packet relay apparatus 300 connects only the terminal with communication permission granted by the authentication server 700-1 or 700-2, to the core network 400.

The terminal 10-1 operates as a MAC address authentication target terminal when running as a mainframe terminal, while operating as a Web authentication target terminal when running as a TCP-IP terminal. The terminal 10-2 operates as a MAC authentication target terminal. The terminal 10-3 operates as an IEEE802.1X authentication target terminal. The terminal 10-4 operates as a Web authentication target terminal.

The packet relay apparatus 300 includes a hardware part 100 and a software part 200. The hardware part 100 includes: an unauthenticated packet processing unit 110 for discarding a packet transmitted from an unauthenticated terminal, or for transferring the packet to the software part 200; and an authentication success packet processing unit 120 for processing a packet transmitted from a terminal with communication permission granted by the authentication server.

The authentication success packet processing unit 120 includes an authentication success packet operation DB 121. The authentication success packet operation DB 121 registers the type of packet transmitted from a terminal with communication permission granted by the authentication server. The authentication success packet processing unit 120 compares the received packet with the authentication success packet operation DB 121, to determine whether the received packet matches the type of the packet with communication permission granted. When matching, the authentication success packet processing unit 120 relays the packet to the core network 400-1 or 400-2. On the other hand, when the received packet does not match the type of packet with communication permission granted as a result of comparison with the authentication success packet operation DB 121, the authentication success packet processing unit 120 transfers the packet to the unauthenticated packet processing unit 110.

The unauthenticated packet processing unit 110 includes an unauthenticated packet operation DB 111. The unauthenticated packet operation DB 111 registers the type of packet to be transferred to the software part received from an unauthenticated terminal. The authentication packet processing unit 110 compares the received packet with the unauthenticated packet operation DB 111. When matching, the unauthenticated packet processing unit 110 transfers the packet to the software part 200. On the other hand, when the received packet does not match as a result of comparison with the unauthenticated packet operation DB 111, the unauthenticated packet processing unit 110 discards the packet.

The software part 200 includes: an unauthenticated packet distribution unit 240 for distributing packets transferred from the unauthenticated packet processing unit 110, to different authentication processing units; a MAC address authentication processing unit 210 for processing MAC address authentication; a Web authentication processing unit 220 for processing Web authentication; and an IEEE802.1X authentication processing unit 230 for processing IEEE802.1X authentication.

The unauthenticated packet distribution unit 240 determines the type of authentication to be used for each packet received from the unauthenticated packet processing unit 110, among MAC address authentication, Web authentication, and IEEE802.1X authentication. Then, the unauthenticated packet distribution unit 240 transfers each packet to one of the MAC address authentication processing unit 210, the Web authentication processing unit 220, and the IEEE802.1X authentication processing unit 230.

The MAC address authentication processing unit 210 includes an authentication server selection DB 211. The authentication server selection DB 211 registers the authentication servers 700 to be selected for each packet type are registered. Upon reception of a packet, the MAC address authentication processing unit 210 compares the packet with the authentication server selection DB 211 to select the authentication server 700 to perform authentication.

The core network 400-1 is connected to two application servers 500 each capable of TCP/IP communication. The core network 400-2 is connected to a mainframe 600.

Figure 2:
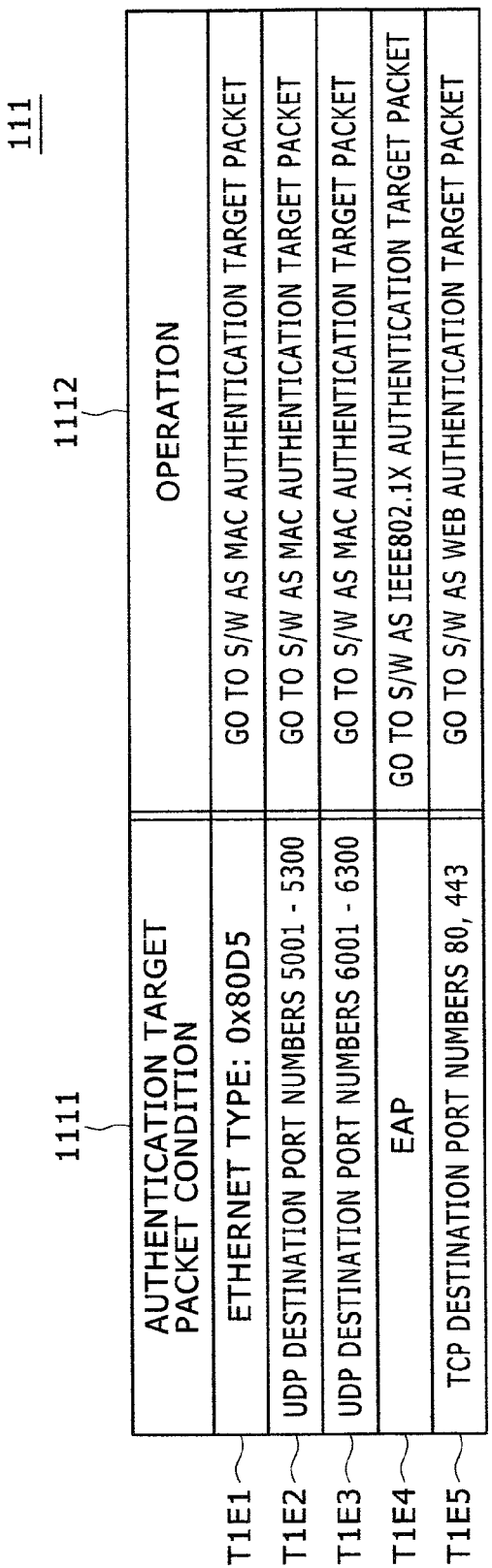
FIG. 2 is a view showing an unauthenticated packet operation DB.

Referring to FIG. 2, description will be made on the unauthenticated packet operation DB that specifies operations of unauthenticated packets. Here, FIG. 2 is a view showing the unauthenticated packet operation DB. In FIG. 2, the unauthenticated packet operation DB 111 specifies packet types and operations in order to perform authentication processing in the packet relay apparatus 300. Reference characters T1E1 to T1E5 denote entries. The entries include an authentication target packet condition 1111 and a target packet operation 1112. Some examples of the entries are as follows: T1E1 is specified with Ethernet type of 0x80D5 as the authentication target packet condition, and "go to S/W 200 as MAC authentication target packet" as the operation. T1E5 is specified with TCP destination port numbers of 80 (http) and 443 (https) as the authentication target packet condition, and "go to S/W 200 as Web authentication target packet" as the operation. Incidentally, an extensible authentication protocol (EAP) of T1E4 is a packet of IEEE802.1X authentication processing. FIG. 2 is an example, and any field of an authentication target packet can be set as the authentication target packet condition 1111. For example, it is possible to set any of the following fields: layer 2 header fields such as Ethernet type and MAC address; layer 3 header fields such as source IP address, destination IP address, and protocol number; layer 4 header fields such as destination port number and source port number of TCP/UDP; or a combination of such fields. The unauthenticated packet processing unit 110 processes a packet that matches the authentication target packet condition 1111, based on the corresponding operation 1112. This makes it possible to determine the type of authentication to be used for each packet, based on the type of packet. It is also possible to avoid unnecessary authentication processing by not transferring, to the software part 200, a packet that does not match the authentication target packet condition 1111.

Figure 3:
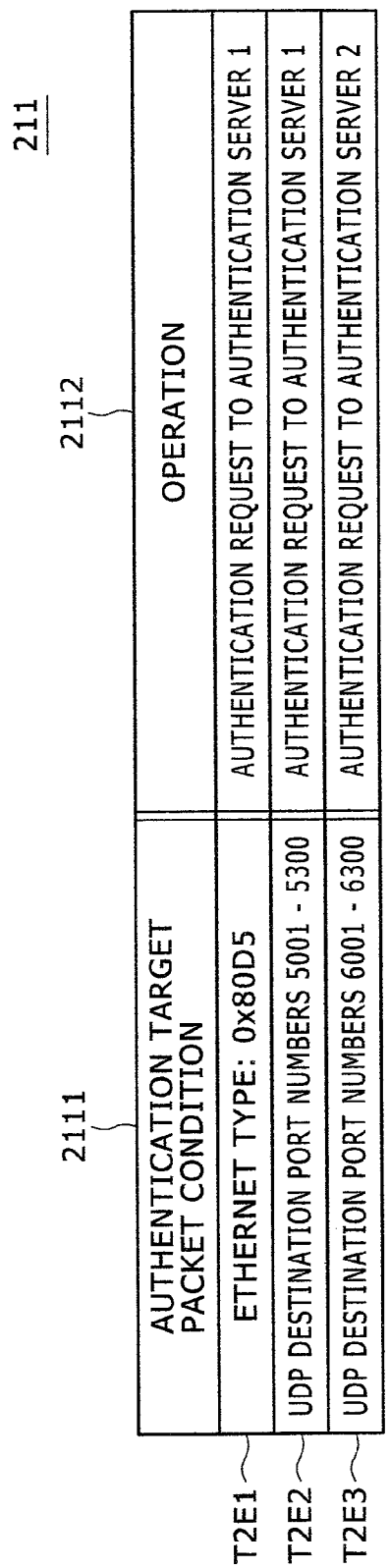
FIG. 3 is a view showing an authentication server selection DB.

Referring to FIG. 3, description will be made on the authentication server selection DB for selecting the destination authentication server of an authentication request for each type of MAC address authentication target packet. Here, FIG. 3 is a view showing the authentication server selection DB. In FIG. 3, the authentication server selection DB 211 specifies settings for selecting the authentication server 700 to which an authentication request is issued, when MAC address authentication processing is performed in the packet relay apparatus 300. Reference characters T2E1 to T2E3 denote entries. The entries include an authentication target packet condition 2111 and a target packet operation 2112. Some examples of the entries are as follows: T2E1 is specified with Ethernet type of 0x80D5 as the authentication target packet condition, and "authentication request to authentication server 700-1" as the operation. Further, it is also possible to set any field of an authentication target packet, similarly to the authentication target packet condition 1111 of FIG. 2.

Referring to FIG. 4, description will be made on the authentication success packet operation DB in the case of granting communication permission to all packets transmitted from terminals having succeeded in authentication, or to packets of specified applications among the packets transmitted from the terminals having succeeded in authentication. Here, FIG. 4 is a view showing the authentication success packet operation DB. In FIG. 4, the authentication success packet operation DB 121 registers types of packets that have been successfully authenticated and are granted with relay permission in the packet relay apparatus 300. Unregistered packets are treated as unauthenticated packets, and processed in the unauthenticated packet processing unit 110. Reference characters T3E1 to T3E4 denote entries. The entries include a packet condition 1211 and a target packet operation 1222. Some examples of the entries are as follows: T3E1 is specified with source MAC address of A as the packet condition, and "relay" as the operation. Here, the source MAC address A is the MAC address of a terminal that has been successfully authenticated. In this case, all the packets transmitted from the terminal that has been successfully authenticated are relayed. Further, T3E3 is specified with source MAC address of C with UDP port destination numbers 5001 to 5300 as the packet condition, and "relay" as the operation. In this case, only packets of the specified application are relayed among the packets transmitted from the terminal that has been successfully authenticated.

Figure 5:
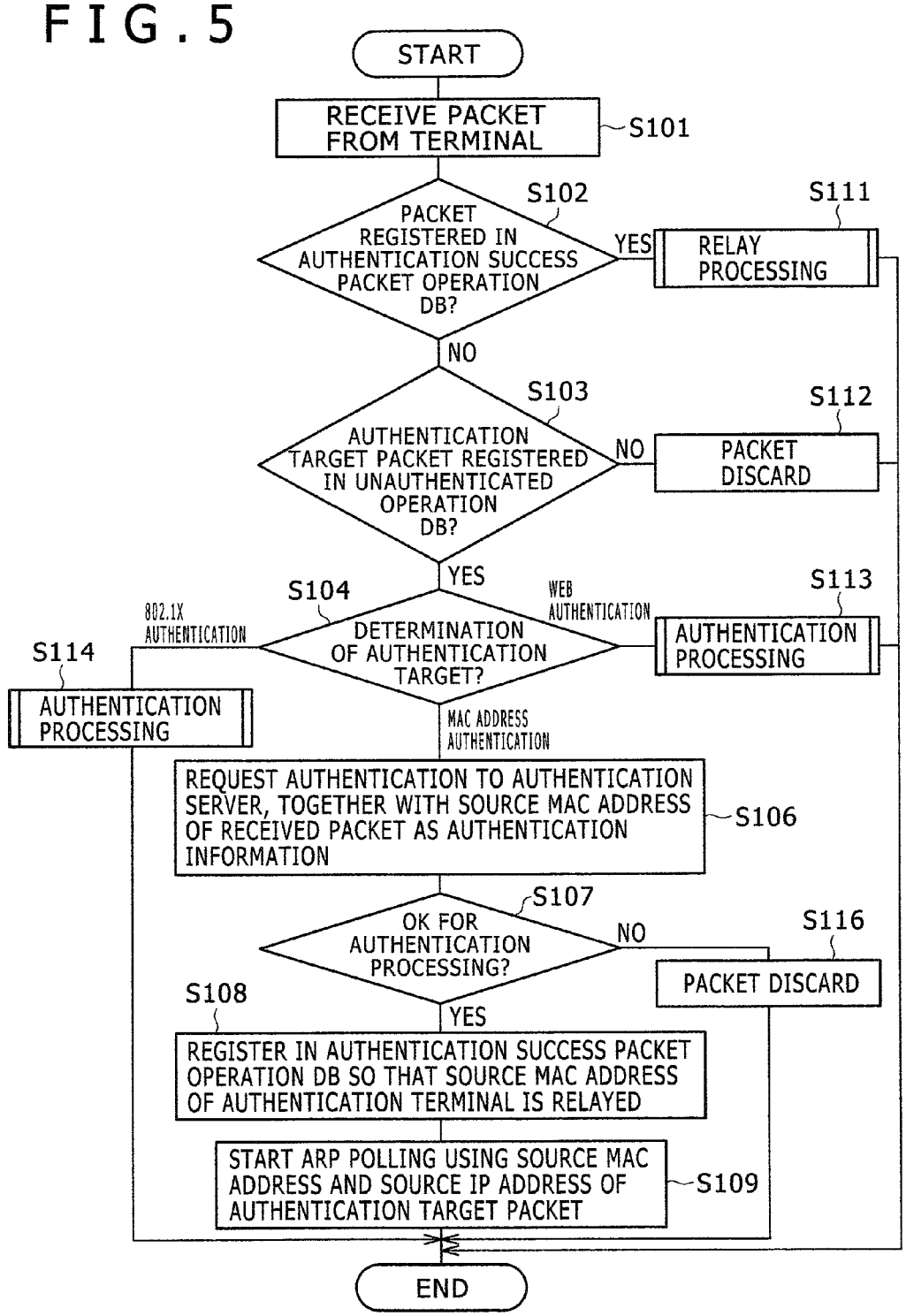
FIG. 5 is a flowchart of the packet relay apparatus.

Referring to FIG. 5, description will be made on the processing operation of the packet relay apparatus. Here, FIG. 5 is a flowchart of the packet relay apparatus. The operation for selecting an authentication target packet will be described, focusing on MAC address authentication according to FIG. 5. In FIG. 5, the packet relay apparatus 300 first receives a packet from the terminal 10 (S101). The authentication success packet processing unit 120 of the packet relay apparatus 300 determines whether the received packet is registered in the authentication success packet operation DB 121 (S102). When the answer is YES, the authentication success packet processing unit 120 performs relay processing (S111), and ends the operation.

When the answer is NO in step 102, the unauthenticated packet processing unit 110 searches the unauthenticated packet operation DB 111 for the entry whose authentication target packet condition corresponds to the received packet (S103). When no corresponding entry is found (NO), the unauthenticated packet processing unit 110 discards the packet (S112), and ends the operation. When the corresponding entry is found (S103: YES), the unauthenticated packet processing unit 110 determines the type of authentication target packet to which the received packet corresponds, based on the operation 1112 of the relevant entry. Then, the unauthenticated packet processing unit 110 transfers the packet to the unauthenticated packet distribution unit 240 of the software part 200. The unauthenticated packet distribution unit 240 transfers the received authentication target packet to the MAC address authentication processing unit 210, or the Web authentication processing unit 220, or the IEEE802.1X authentication processing unit 230, based on the determination result of the unauthenticated packet processing unit 110 (S104). When the received packet is a Web authentication target packet, the unauthenticated packet distribution unit 240 causes the Web authentication processing unit 220 to perform authentication processing (S113). When the received packet is determined as an IEEE802.1X authentication target packet in step 104, the unauthenticated packet distribution unit 240 causes the IEEE802.1X authentication processing unit 230 to perform authentication processing (S114).

When the received packet is determined as a MAC address authentication target packet in step 104, the unauthenticated packet distribution unit 240 transfers the packet to the MAC address authentication processing unit 210. Then, the MAC address authentication processing unit 210 selects the corresponding authentication server, based on the authentication server selection DB 211. The MAC address authentication processing unit 210 issues an authentication request to the authentication server 700 (S106). At this time, the source MAC address of the received packet, and if necessary, its Ethernet type, IP address, and TCP/UDP port numbers are added as authentication information. The authentication server 700 performs authentication processing, and transmits the authentication result to the packet relay apparatus 300. The authentication result includes information of authentication success or authentication failure. The MAC address authentication processing unit 210 confirms whether the authentication result received from the authentication server 700 is authentication success or authentication failure (S107). When the result is authentication failure (NO), the MAC address authentication processing unit 210 discards the packet (S116), and ends the operation. When the result of step 107 is authentication success (YES), the MAC address authentication processing unit 210 registers the source MAC address and, if instructed by the authentication server, the application conditions such as Ethernet type, IP address, and TCP/UDP port numbers, to the packet condition 1211 of the authentication success packet operation DB 121, while registering "relay" to the operation 1222 (S108). The MAC address authentication processing unit 210 starts ARP polling using the source MAC address and source IP address of the authentication target packet (S109), and ends the operation.

Figure 6:
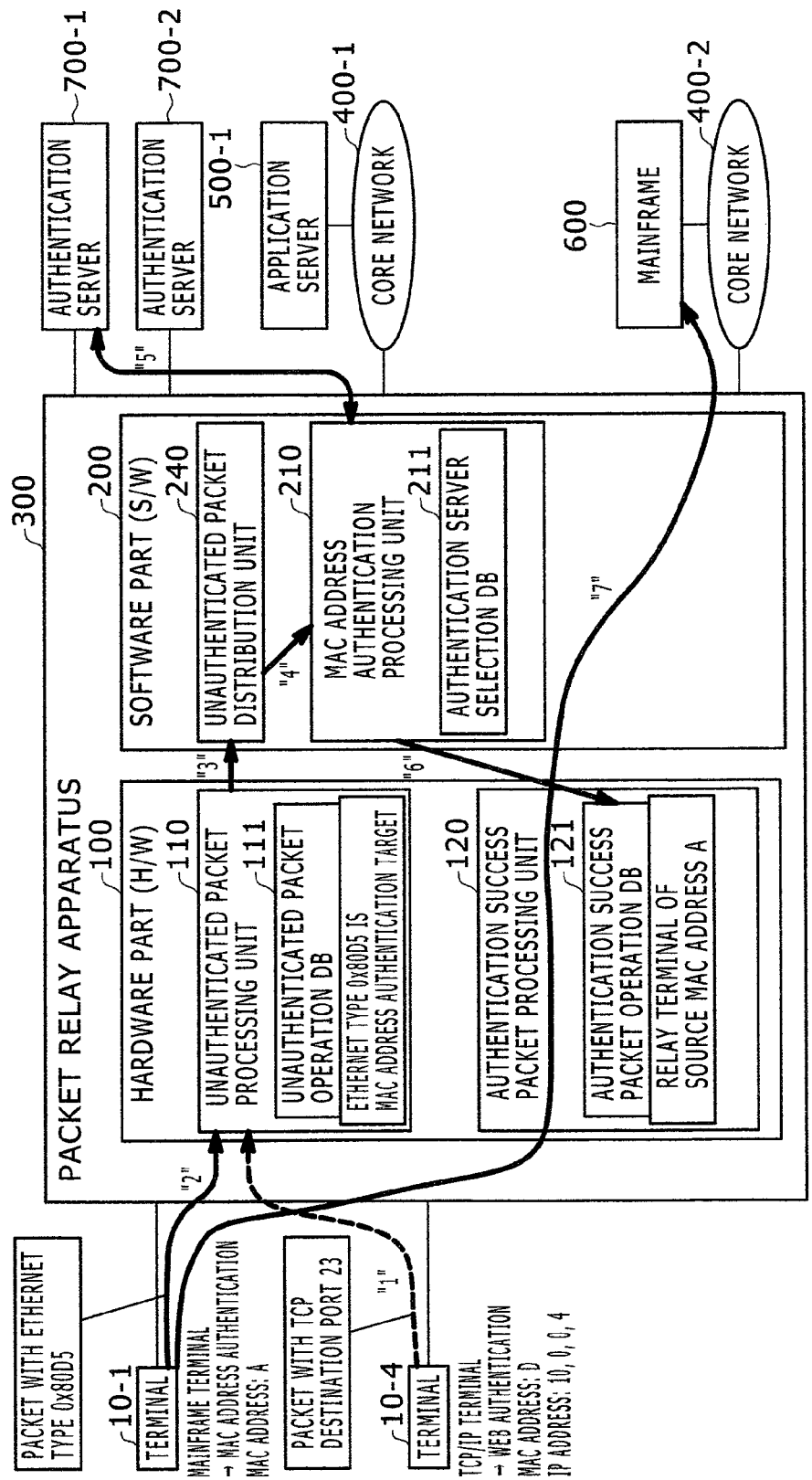
FIG. 6 is a block diagram showing the flow of authentication processing (part 1)

Referring to FIG. 6, description will be made on the processing of MAC address authentication that is performed only for the mainframe terminal in the network authentication system. Here, FIG. 6 is a block diagram showing the flow of the authentication processing. Incidentally, in FIG. 6, as well as in FIGS. 7 and 8 which will be described later, it is assumed that the initial value of the authentication success packet operation DB 121 is empty.

In FIG. 6, the terminal 10-4 is a TCP-IP terminal, and transmits a telnet packet using protocol TCP with a destination port number of 23, to the packet relay apparatus 300.

Because the MAC address of the terminal 10-4 is not registered in the authentication success packet operation DB 121, the authentication success packet processing unit 120 of the packet relay apparatus 300 determines that the terminal is an unauthenticated terminal. The unauthenticated packet processing unit 110 compares the received packet with the unauthenticated packet operation DB 111. As a result of the comparison, the unauthenticated packet processing unit 110 determines that the received packet is not an authentication target packet, and discards the packet ("1" in the figure).

The terminal 10-1, which is also a mainframe terminal, transmits a system network architecture (SNA) frame of Ethernet type 0x80D5, to the packet relay apparatus 300. Here, the SNA frame means a packet of the mainframe. Because the MAC address of the terminal 10-1 is not registered in the authentication success packet operation DB 121, the authentication success packet processing unit 120 of the packet relay apparatus 300 determines that the terminal is an unauthenticated terminal. The unauthenticated packet processing unit 110 compares the received packet with the unauthenticated packet operation DB 111. As a result of the comparison, the unauthenticated packet processing unit 110 determines that the packet is a MAC authentication target packet ("2"). The unauthenticated packet processing unit 110 transfers the packet to the unauthenticated packet distribution unit 240 ("3"). The unauthenticated packet distribution unit 240 determines that the packet is a MAC address authentication target, and transfers the packet to the MAC address authentication processing unit 210 ("4"). The MAC address authentication processing unit 210 compares the packet with the authentication server selection DB 211, and selects the authentication server 700-1 to which an authentication request is issued. The MAC address authentication processing unit 210 transmits the source MAC address of the packet to the authentication server 700-1 as authentication information. The authentication server 700-1 transmits the authentication determination result to the packet relay apparatus 300 ("5"). Because the authentication determination result is authentication success, the MAC address authentication processing unit 210 registers the source MAC address of the packet to the authentication success packet operation DB 121 ("6"). Subsequently, the authentication success packet processing unit 120 determines to relay the packet transmitted from the terminal 10-1, thereby allowing communication between the terminal 10-1 and the mainframe 600 of the core network 400-2 ("7").

Figure 7:
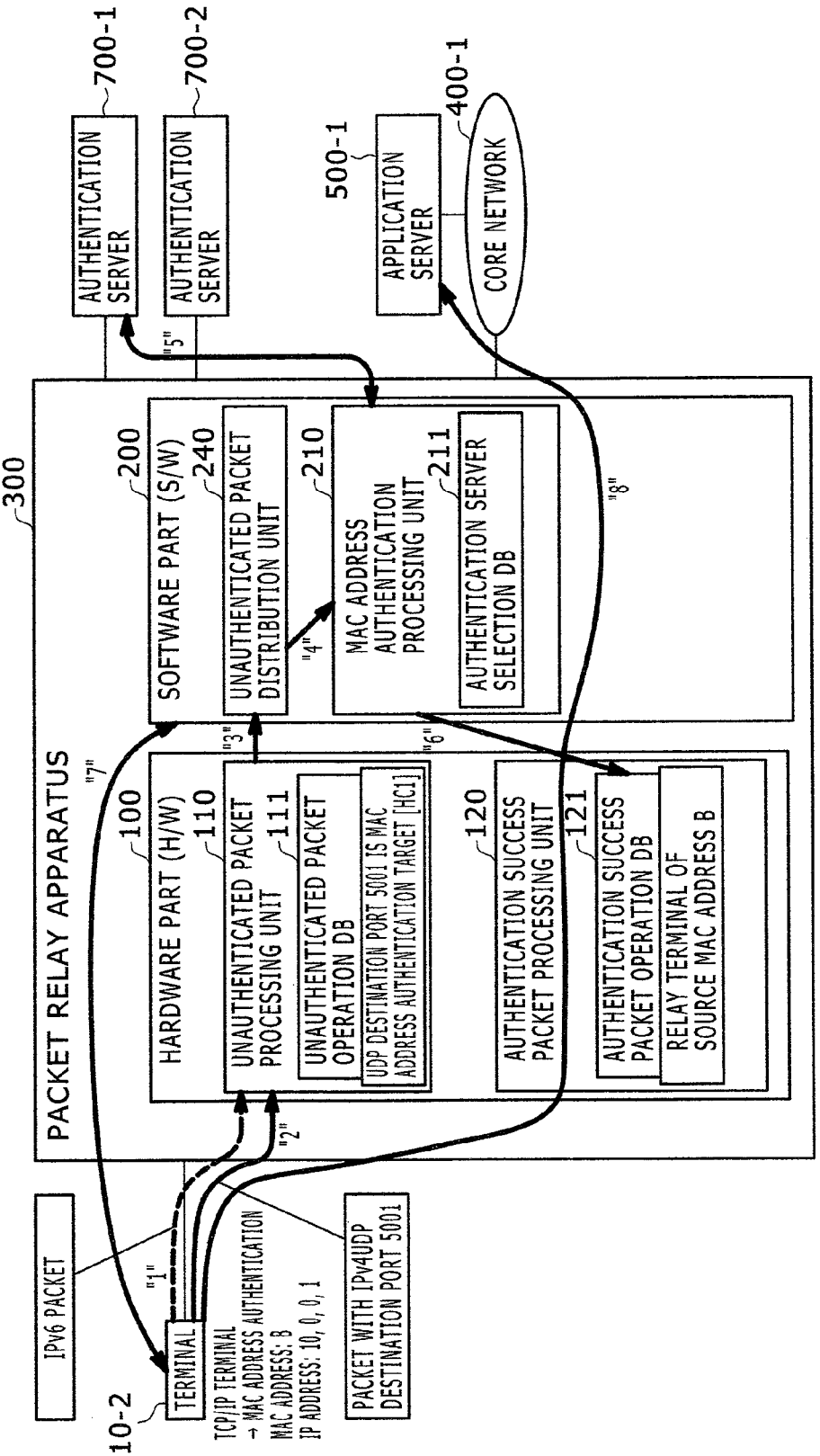
FIG. 7 is a block diagram showing the flow of authentication processing (part 2)

Referring to FIG. 7, description will be made on the processing of an IPv4 packet as a MAC address authentication target packet in the network authentication system. Here, FIG. 7 is a block diagram showing the flow of the authentication processing. In FIG. 7, the terminal 10-2 is a TCP/IP terminal. The terminal 10-2 transmits an IPv6 packet to the packet relay apparatus 300. Because the MAC address of the terminal 10-2 is not registered in the authentication success packet operation DB 121, the authentication success packet processing unit 120 determines that the terminal is an unauthenticated terminal. The unauthenticated packet processing unit 110 compares the received packet with the unauthenticated packet operation DB 111. As a result of the comparison, the unauthenticated packet processing unit 110 determines that the packet is not an authentication target packet, and discards the packet ("1").

Next, the terminal 10-2 transmits a packet using protocol UDP with a destination address port number of 5001, to the packet relay apparatus 300. Because the MAC address of the terminal 10-2 is not registered in the authentication success packet operation DB 121, the authentication success packet processing unit 120 of the packet relay apparatus 300 determines that the terminal 10-2 is an unauthenticated terminal. The unauthenticated packet processing unit 110 compares the received packet with the unauthenticated packet operation DB 111. As a result of the comparison, the unauthenticated packet processing unit 110 determines that the packet is a MAC authentication target packet ("2"). The unauthenticated packet processing unit 110 transfers the packet to the unauthenticated packet distribution unit 240 ("3"). The unauthenticated packet distribution unit 240 determines that the packet is a MAC address authentication target, and transfers the packet to the MAC address authentication processing unit 210 ("4"). The MAC address authentication processing unit 210 compares the packet with the authentication server selection DB 211. As a result of the comparison, the MAC address authentication processing unit 210 selects the authentication server 700-1 to which an authentication request is issued. The MAC address authentication processing unit 210 transmits the source MAC address of the packet to the authentication server 700-1, as authentication information.

The authentication server 700-1 transmits the authentication determination result to the packet relay apparatus 300 ("5"). Because the authentication determination result is authentication success, the MAC address authentication processing unit 210 registers the source MAC address of the packet to the authentication success packet operation DB 121 ("6"). The software part 200, which stores the IP address and MAC address of the terminal 10-2, performs ARP polling to the terminal 10-2 and continues to confirm the presence of the terminal ("7"). Subsequently, the authentication success packet processing unit 120 determines to relay the packet transmitted from the terminal 10-2, thereby allowing communication between the terminal 10-2 and the application server 500-1 of the core network 400-1 ("8").

Figure 8:
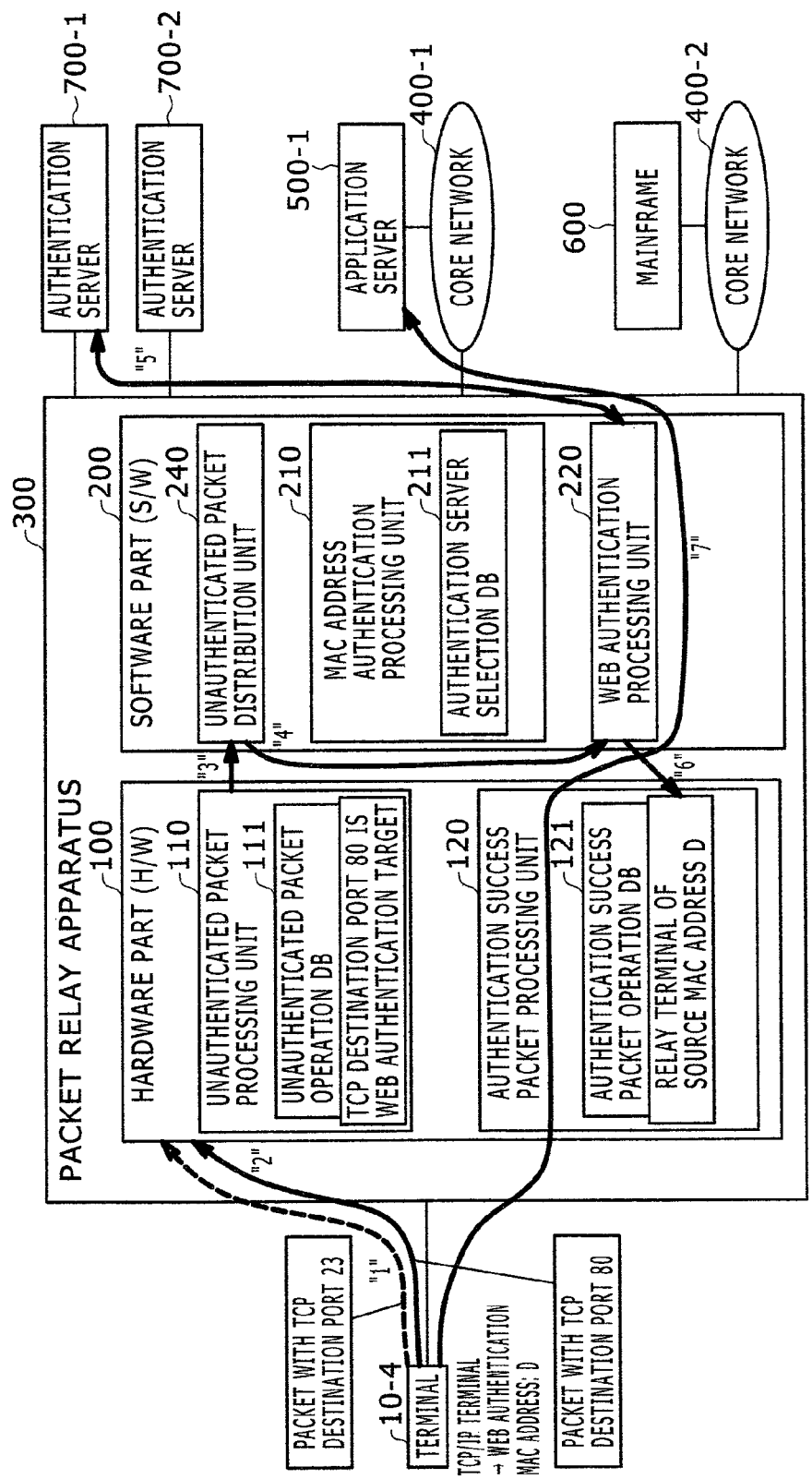
FIG. 8 is a block diagram showing the flow of authentication processing (part 3)

Referring to FIG. 8, description will be made on the processing of an IPv4 http packet as a Web authentication target packet in the network authentication system. Here, FIG. 8 is a block diagram showing the flow of the authentication processing. In FIG. 8, the terminal 10-4 is a TCP/IP terminal. The terminal 10-4 transmits a packet using protocol TCP with a destination port number of 23 (telnet), to the packet relay apparatus 300. Because the MAC address of the terminal 10-4 is not registered in the authentication success packet operation DB 121, the authentication success packet processing unit 120 of the packet relay apparatus 300 determines that the terminal is an unauthenticated terminal. The unauthenticated packet processing unit 110 compares the received packet with the unauthenticated packet operation DB 111. As a result of the comparison, the unauthenticated packet processing unit 110 determines that the packet is not an authentication target packet, and discards the packet ("1").

The terminal 10-4 transmits a packet using protocol TCP with a destination port number of 80, to the packet relay apparatus 300. Because the MAC address of the terminal 10-4 is not registered in the authentication success packet operation DB 121, the authentication success packet processing unit 120 of the packet relay apparatus 300 determines that the terminal is an unauthenticated terminal. The unauthenticated packet processing unit 110 compares the received packet with the unauthenticated packet operation DB 111. As a result of the comparison, the unauthenticated packet processing unit 110 determines that the packet is a Web authentication packet ("2"). Then, the unauthenticated packet processing unit 110 transfers the packet to the unauthenticated packet distribution unit 240 ("3").

The unauthenticated packet distribution unit 240 determines that the packet is a Web authentication target, and transfers the packet to the Web authentication processing unit 220 ("4"). The Web authentication processing unit 220 compares the received packet with the authentication server selection DB not shown. As a result of the comparison, the Web authentication processing unit 220 selects the authentication server 700-1 to which an authentication request is issued. The Web authentication processing unit 220 transmits the user name corresponding to the terminal 10-4 and its password, to the authentication server 700-1 as authentication information. The authentication server 700-1 transmits the authentication determination result to the packet relay apparatus 300 ("5"). Because the authentication determination result is authentication success, the Web authentication processing unit 220 registers the source MAC address of the packet, "D", to the authentication success packet operation DB 121 ("6"). Subsequently, the authentication success packet processing unit 120 determines to relay the packet transmitted from the terminal 10-4, thereby allowing communication between the terminal 10-4 and the application server 500-1 of the core network 400-1 ("7").

Incidentally, IEEE802.1X authentication is processed in the same way as described in FIG. 8. Further, in the above description, the unauthenticated packet distribution unit 240 is provided in the software part 200 of the packet relay apparatus 300. However, the unauthenticated packet processing unit 110 of the hardware part 100 may distribute to the respective authentication processing units 210 to 230.

According to the embodiment, when MAC address authentication is performed in the network authentication system, it is possible to reduce unnecessary load on the CPU of the packet relay apparatus for performing MAC address authentication. Further, it is possible to select from plural authentication methods for each application or OS running on a single terminal.

Referring to FIG. 9, description will be made on an example of processing an IPx4 http packet as a MAC authentication target packet in the network authentication system. Here, FIG. 9 is a block diagram showing the flow of the authentication processing. In FIG. 9, the terminal 10-2 is a TCP/IP terminal. The terminal 10-2 transmits a packet using protocol TCP with a destination port number of 80, to the packet relay apparatus 300. Because the MAC address of the terminal 10-2 is not registered in the authentication success packet operation DB 121, the authentication success packet processing unit 120 of the packet relay apparatus 300 determines that the terminal 10-2 is an unauthenticated terminal. The unauthenticated packet processing unit 110 compares the received packet with the unauthenticated packet operation DB 111. As a result of the comparison, the unauthenticated packet processing unit 110 determines that the packet is a MAC authentication target packet ("1"). Then, the unauthenticated packet processing unit 110 transfers the packet to the unauthenticated packet distribution unit 240 ("2").

The unauthenticated packet distribution unit 240 determines that the packet is a MAC address authentication target, and transfers the packet to the MAC address authentication processing unit 210 ("3"). The MAC address authentication processing unit 210 compares the packet with the authentication server selection DB 211. As a result of the comparison, the MAC address authentication processing unit 210 selects the authentication server 700-1 to which an authentication request is issued. Then, the MAC address authentication processing unit 210 transmits the source MAC address of the packet to the authentication server 700-1, as authentication information. The authentication server 700-1 transmits the authentication determination result to the packet relay apparatus 300 ("4"). Because the authentication determination result is authentication failure, the MAC address authentication processing unit 210 transmits an http packet so that the terminal 10-2 jumps to a MAC address registration application server 800 ("5"). Then, the terminal 10-2 accesses the MAC address registration application server ("6").

What is claimed is:

1. A packet relay apparatus for accommodating a terminal device to relay transmission/reception of a packet between the terminal device and an information processing device including an authentication device, the packet relay apparatus comprising:

a MAC address authentication processing unit for transmitting an authentication request to the authentication device which performs MAC address authentication using a source MAC address included in a packet received from the terminal device, while receiving an authentication determination;

a Web authentication processing unit for processing Web authentication using a user name of the terminal device and password;

an IEEE802.1X authentication processing unit for processing IEEE802/1X authentication; and an unauthenticated packet processing unit for transferring a packet from an unauthenticated terminal to one of the MAC address authentication processing unit, the Web authentication processing unit, and the IEEE802.1X authentication processing unit, by referring to a database;

wherein the user name and the password are not the MAC address, and wherein said unauthenticated packet processing unit identifies a type of the packet depending on at least one field of layer 2 header, layer 3 header or layer 4 header, or the combination of the fields of the received packet from the terminal device, compares the type of the packet from the unauthenticated terminal with the database, transfers the packet to one of the MAC address authentication processing unit, the Web authentication processing unit, and the IEEE802.1X authentication processing unit when a corresponding entry is found, and discards the packet when no corresponding entry is found.

2. The packet relay apparatus according to claim 1, further comprising:
   an authentication success packet processing unit for referring to a second database, and transferring a packet whose source address is not stored in the second database, to the unauthenticated packet processing unit.

3. The packet relay apparatus according to claim 2,
   wherein said authentication processing unit is realized by software, and the unauthenticated packet processing unit is realized by hardware.

4. The packet relay apparatus according to claim 1,
   wherein said authentication processing unit is realized by software, and the unauthenticated packet processing unit is realized by hardware.

5. The packet relay apparatus according to claim 1, wherein said authentication processing unit is realized by software, and the unauthenticated packet processing unit is realized by hardware.

6. The packet relay apparatus according to claim 1,
   wherein, of packets transmitted from an authentication target terminal, only a packet with a terminal MAC address and an IP address that can be identified, is treated as an authentication target packet.

7. The packet relay apparatus according to claim 1,
   wherein said packet relay apparatus inquires different authentication servers for each received authentication target packet.

8. The packet relay apparatus according to claim 1,
   wherein, when said determination result of the authentication server is communication permission, the packet relay apparatus permits communication of only a predetermined packet, instead of all the packets transmitted from the terminal.

9. The packet relay apparatus according to claim 1,
   wherein, when said determination result of the authentication server is communication prohibition, the packet relay apparatus transmits a packet to instruct an operation to the terminal.

10. A packet relay apparatus for being connected to a terminal device via a network, and for transmitting/receiving a packet, the packet relay apparatus comprising:
    a MAC address authentication processing unit for performing MAC address authentication using a source MAC address included in a packet received from the terminal device;
    a Web authentication processing unit for processing Web authentication using a user name of the terminal device and password;
    an IEEE802.1X authentication processing unit for processing IEEE802.1X authentication;
    an unauthenticated packet processing unit for transferring a packet from an unauthenticated terminal to one of the MAC address authentication processing unit, the Web authentication processing unit, and the IEEE802.1X authentication processing unit; and
    a database for correspondingly storing packet types and authentication to be processed;
    wherein the user name and the password are not the MAC address, and
    wherein said unauthenticated packet processing unit identifies a type of the packet depending on at least one field of layer 2 header, layer 3 header or layer 4 header, or the combination of the fields of the received packet from the terminal device, transfers the packet to one of the MAC address authentication processing unit, the Web authentication processing unit, and the IEEE802.1X authentication processing unit depending on the correspondence of the identified type of the packet and the authentication to be processed in the database, and discards the packet when the identified type of the packet is not stored in the database.

11. A packet relay apparatus for being connected to a terminal device via a network, and for transmitting/receiving a packet, the packet relay apparatus comprising:
    a MAC address authentication processing unit for performing MAC address authentication using a source MAC address included in a packet received from the terminal device;
    a Web authentication processing unit for processing Web authentication using a user name of the terminal device and password;
    an unauthenticated packet processing unit for transferring a packet from an unauthenticated terminal to one of the MAC address authentication processing unit, the Web authentication processing unit and the IEEE802: IX authentication processing unit; and
    a database for correspondingly storing packet types and authentication to be processed;
    wherein the user name and the password are not the MAC address, and
    wherein said unauthenticated packet processing unit identifies a type of the packet depending on at least one field of layer 2 header, layer 3 header or layer 4 header, or the combination of the fields of the received packet from the terminal device, transfers the packet to the MAC address authentication processing unit or the Web authentication processing unit depending on the correspondence of the identified type of the packet and the authentication to be proceed in the database, and discards the packet when the identified type of the packet is not stored in the database.

12. A packet relay apparatus for being connected to a terminal device via a network, and for transmitting/receiving a packet, the packet relay apparatus comprising:
    a MAC address authentication processing unit for performing MAC address authentication using a source MAC address included in a packet received from the terminal device;
    an IEEE802.1X authentication processing unit for processing IEEE802.1X authentication;
    an unauthenticated packet processing unit for transferring a packet from an unauthenticated terminal to one of the MAC address authentication processing unit and the IEEE802.1X authentication processing unit; and
    a database for correspondingly storing packet types and authentication to be processed;
    wherein said unauthenticated packet processing unit identifies a type of the packet depending on at least one field of layer 2 header, layer 3 header or layer 4 header, or the combination of the fields of the received packet from the terminal device, transfers the packet to the MAC address authentication processing unit or the IEEE802.1X authentication processing unit depending on the correspondence of the identified type of the packet and the authentication to be processed in the database, and discards the packet when the identified type of the packet is not stored in the database.

\* \* \* \* \*